United States Patent Office 3,498,185
Patented Mar. 3, 1970

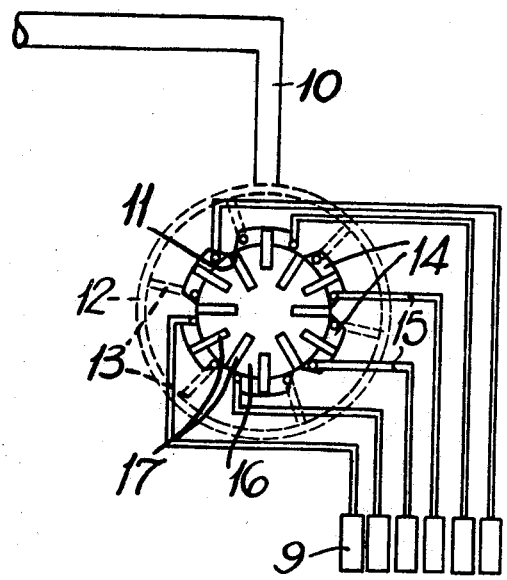

3,498,185
FLOW DISTRIBUTOR DEVICES FOR INTERNAL COMBUSTION ENGINE FUEL INJECTION SYSTEMS
Eugene Harold Warne, Solihull, England, assignor to Joseph Lucas (Industries) Limited, Birmingham, England
Filed June 6, 1968, Ser. No. 734,974
Int. Cl. F01c *1/00;* F04b *13/02*
U.S. Cl. 91—121             1 Claim

ABSTRACT OF THE DISCLOSURE

A fluid distributor device for use in a fuel injection system for an internal combustion engine comprising, a body containing a rotor, a single inlet, and a plurality of outlet passages, the body having a plurality of equi-angularly spaced chambers disposed adjacent to the rotor periphery, each chamber communicating with the inlet and with one of the outlets respectively, the rotor carrying a plurality of equiangularly spaced vanes which are radially slidable with respect to the axis of rotation of the rotor 16 to sweep through the chambers in turn so that fluid flows between the inlet and the outlets through the chambers respectively.

---

The invention relates to flow distributor devices for use in fuel injection systems for internal combustion engines, such systems being of the kind in which fuel is delivered through a plurality of injection nozzles disposed in the inlet manifold of the engine.

The object of the invention is to provide a flow distributor device for a fuel system of the kind specified in a convenient form.

According to the present invention a flow distributor device for a fuel system of the kind specified comprises a body, a rotor disposed within the body, a single inlet to a gallery in the body, a plurality of inlet passages affording communication between said inlet and a plurality of equi-angularly spaced chambers disposed adjacent to the rotor periphery respectively, a plurality of outlet passages leading from the chambers to respective outlets in the body, each chamber having its inlet passage and its outlet passage disposed at opposite ends of the chamber respectively, and the rotor carrying a plurality of equi-angularly spaced vanes which are radially slidable with respect to the axis of rotation of the rotor as the latter rotates, to sweep through the chambers in turn, the spacing of adjacent vanes being less than the distance between adjacent inlet and outlet passages.

The invention will now be described by way of example with reference to the accompanying drawing, the single figure of which illustrates diagrammatically, a flow distributor device constructed in accordance with the invention.

The device illustrated is intended for use in a fuel system for supplying fuel to the inlet manifold of a multi-cylinder internal combustion engine, through a plurality of injector nozzles 9 which are disposed in the manifold, the number of these corresponding to the number of cylinders in the engine.

The device is for use in association with a system for controlling the rate of fuel to the injector nozzle 9 which forms the subject of our co-pending British patent application No. 5109/67.

The inlet to the distributor device is indicated at 10, and this enters a body (not illustrated) having an interior cavity 11. In the body and communicating with the inlet 10 is a gallery 12 having a plurality of inlet passages 13 communicating therewith. The number of inlet passages 13 corresponds to the number of injector nozzles 9 and communicates with respective chambers 14 in the cavity 11. The chambers 14 have respective outlet passages 15. These chambers 14 are equi-angularly spaced about the central axis of the cavity 11. The outlet passages 15 communicate respectively with the nozzles 9. Each chamber 14 has its inlet passage 13 at one of its ends, while its outlet passage 15 is at the opposite end.

The cavity 11 contains a cylindrical rotor 16 having an external driving shaft (not shown). The rotor 16 carries a plurality of equi-angularly spaced radially movable vanes 17, the number of these vanes 17, in this example, being twice the number of chambers 14, and their spacing around the rotor circumference being equal to half the circumferential spacing between the chambers. The number of vanes and chambers and their spacings are so chosen that at any angular position of the rotor 16 in the body, there will always be a vane 17 in each of the chambers 14, each such vane being disposed between the inlet and outlet thereof. Thus fuel pressure in the inlet passage will cause the rotor to rotate, thus forcing fuel in the chambers 14 in front of the vanes 17 through the outlet passages 15, and to the injector nozzles 9. It will be observed that the rotor 16 is not engine driven, but is rotated by the pressure of the incoming fuel. By means of this arrangement, the incoming fuel is equally divided into a number of equal charges, delivered to an equal number of injector nozzles 9 respectively.

Having thus described my invention what I claim as new and desire to secure by Letters Patent is:

1. A flow distributor device for a fuel system comprising a body, a rotor disposed within the body, a single inlet to a gallery in the body, a plurality of inlet passages affording communication between said inlet and a plurality of equi-angularly spaced chambers disposed adjacent to the rotor periphery respectively, a plurality of outlet passages leading from the chambers to respective outlets in the body, each chamber having its inlet passage, and its outlet passage disposed at opposite ends of the chamber respectively, and the rotor carrying a plurality of equi-angularly spaced vanes which are radially slidable with respect to the axis of rotation of the rotor as the latter rotates, to sweep through the chambers in turn, the circumferential spacing of the vanes being half the circumferential spacing of the chambers.

References Cited

UNITED STATES PATENTS

| | | | |
|---|---|---|---|
| 609,027 | 8/1898 | Hilton et al. | 91—121 X |
| 625,800 | 5/1899 | Pickel et al. | 91—131 |
| 1,445,559 | 2/1923 | Robertson | 91—121 |
| 2,280,272 | 4/1942 | Sullivan | 103—2 X |
| 2,634,688 | 4/1953 | Jakobsen | 103—2 X |
| 2,832,199 | 4/1958 | Adams et al. | 103—2 X |
| 3,071,115 | 1/1963 | Schott | 91—121 X |
| 3,280,747 | 10/1966 | Müller-Meyer | 103—2 |
| 3,384,018 | 5/1968 | Mueller | 103—2 |

DONLEY J. STOCKING, Primary Examiner

W. J. KRAUSS, Assistant Examiner

U.S. Cl. X.R.

103—2